Feb. 20, 1968   J. J. HRONAS ETAL   3,369,320
VEHICLES

Filed July 29, 1965   2 Sheets-Sheet 1

INVENTORS.
JOHN J. HRONAS
WILLIAM L. KRAYER

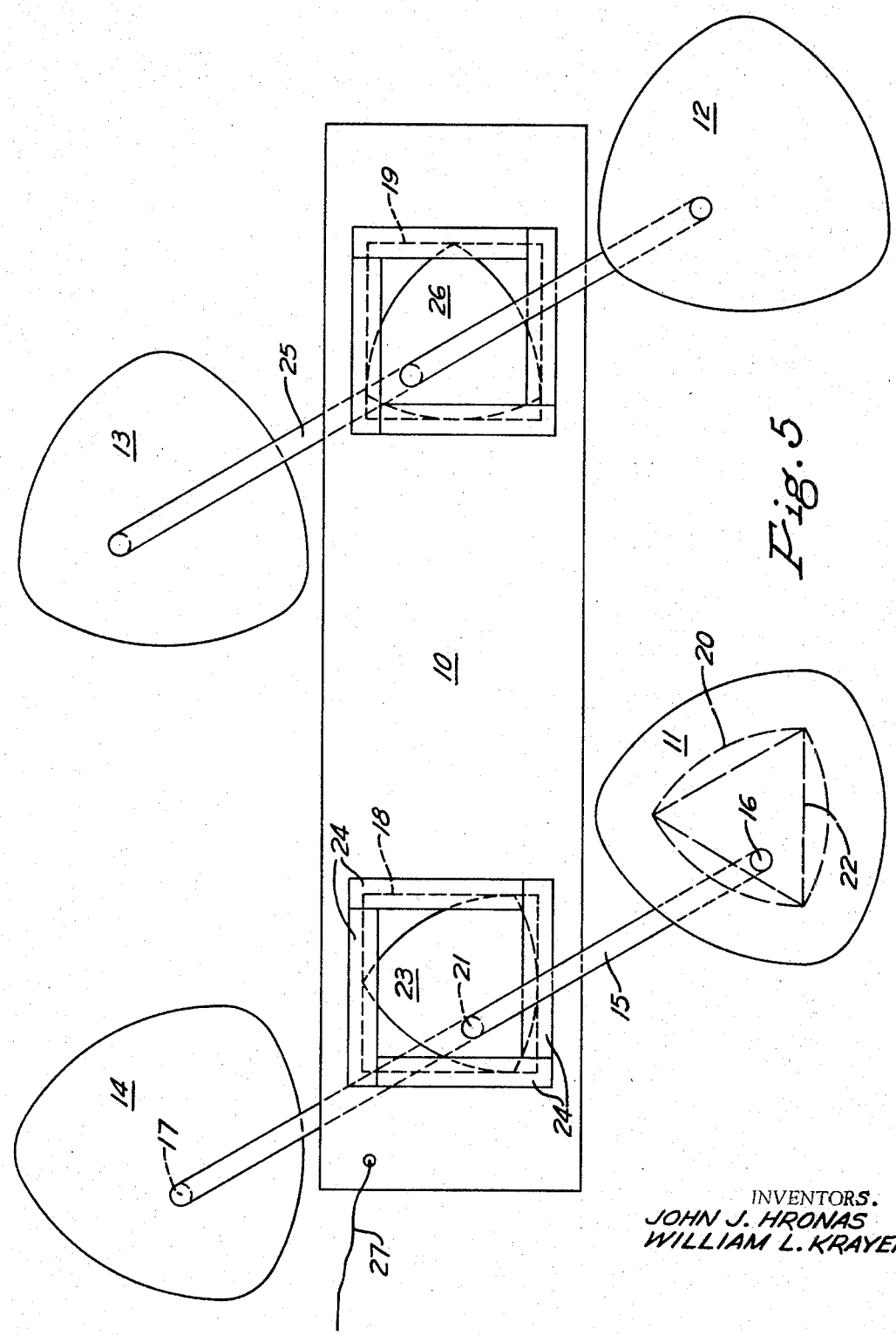

United States Patent Office 3,369,320
Patented Feb. 20, 1968

3,369,320
VEHICLES
John J. Hronas, Pittsburgh, Pa. (1000 Fernview Drive, St. Louis, Mo. 63140), and William L. Krayer, Pittsburgh, Pa. (2348 Southwood Drive, Bridgeville, Pa. 15017)
Filed July 29, 1965, Ser. No. 475,825
10 Claims. (Cl. 46—201)

This invention relates to vehicles. Primarily, it relates to toy vehicles and other vehicles whose purpose is amusement. The vehicles of this invention utilize wheels in the shape of Rouleaux triangles or modifications thereof together with means of eliminating eccentric verticle motion of the chassis.

A Rouleaux triangle may be defined as a closed curve of constant width having the least area possible to touch all four sides of a square of the same width.

The Rouleaux triangle has been used for drilling square holes. See Watts Patents 1,241,175, 1,241,176, 1,241,177.

It is also known that an elongated body having a cross section in the shape of a Rouleaux triangle can support an article resting upon it in such a way that the article will be moved parallel to a surface on which the body is rolled. So far as we are aware, however, a means had not been devised prior to the present invention for supporting an article such as a chassis or the like from an axle attached to a wheel in the shape of a Rouleaux triangle.

We have invented a means by which an axle or similar connecting element for two wheels in the shape of Rouleaux triangles may be made to support a chassis or other article. Such support is accomplished without any eccentric movement of the chassis in relation to the plane on which the wheels are made to move. Our invention will be discussed with reference to the attached drawings, which should be considered as illustrative only.

FIG. 5 is a more or less diagrammatic illustration of our vehicle showing the wheels, axles and template which supports the chassis.

Figure 1:
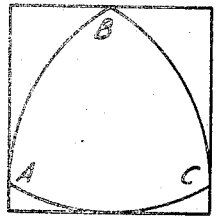
FIGURES 1–3 are diagrammatic illustrations of the known movement of a Rouleaux triangle in a square.
Figure 2:
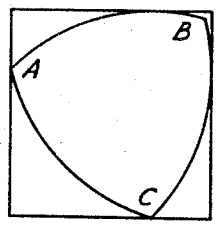
Figure 3:
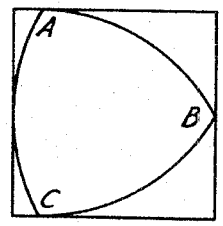

In FIGS. 1–3, it may be seen that Rouleaux triangle will turn in a square of the appropriate size, at all times touching all four sides. The corners A, B, and C of the triangle describe an almost perfect square as they turn. No point on the Rouleaux triangle will, however, serve as an axis during such rotation, i.e., there is no point which remains stationary. See the discussion in "Scientific American," February 1963, page 148.

Figure 4:
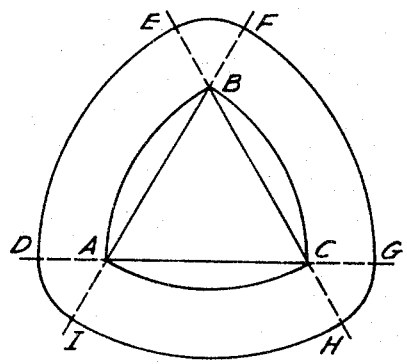
FIG. 4 is a diagrammatic illustration of an expanded Rouleaux triangle.

FIG. 4 illustrates a perfect or symmetrical rounded corner closed curve of constant width. It may be drawn by (a) placing a compass on point A of an equilateral triangle ABC to draw arc FG, (b) from point B drawing arc HI of the same radius, (c) from point C drawing arc DE of the same radius, and (d) drawing connecting arcs DI, EF, and GH from points A, B, and C respectively. The figure DEFGHI describes an "expanded Rouleaux triangle" as referred to herein. The figures described by arcs AB, BC, and CA is known herein as "regular Rouleaux triangle."

In FIG. 5, wheel 11 is shown mounted in fixed relation to axle 15 at 16. The wheel is not permitted to pivot at 16. Wheel 11 is in the shape of an expanded Rouleaux triangle as explained previously with reference to FIG. 4. It is based on an equilateral triangle 22 on which may be constructed a regular Rouleaux triangle 20, shown in dashed lines. Axle 15 is also attached in fixed relation at 21 to a rigid member 23 having a working surface in the shape of a regular Rouleaux triangle. Member 23 is confined in the space of a square shaped working surface 18 by retainers 24 which form a frame around the square. The member 23 and its working surface 18 rest in the chassis 10. Axle 15 is also attached at 17 to wheel 14 which should be maintained in a fixed relation to wheel 11.

Although it is not essential to our invention, a second axle and set of wheels is shown in FIG. 5. Wheels 12 and 13 are attached in fixed relation to axle 25 in the same manner wheels 11 and 14 are attached to axle 15, i.e., in a fixed relation. It will be noted that wheels 12 and 13 are oriented in the same position with respect to each other. Although wheels 11 and 14 are also oriented in the same position with respect to each other, it is not necessary for the wheels of the front set to be oriented in any particular way with respect to wheels of the back set. A template-like recess 19 in the shape of a square, and a member 26 in the shape of a regular Rouleaux triangle are made in the same way as elements 18 and 23 previously described.

When a force is applied to the chassis in a forward or rear direction, as by a child pulling on cord 27, the more or less eccentric motion of wheels 11, 12, 13 and 14 will result in no vertical movement whatever of chassis 10 so long as members 23 and 26 are correctly oriented to their respective wheels, i.e., the corners of member 23 must extend in the same direction as the corners of the diagrammed regular Rouleaux triangle 20 and its counterpart on wheel 14. As a result, a pleasing and remarkable appearance is presented of an eccentric wheel motion and a smooth bumpless chassis motion.

Figure 6:
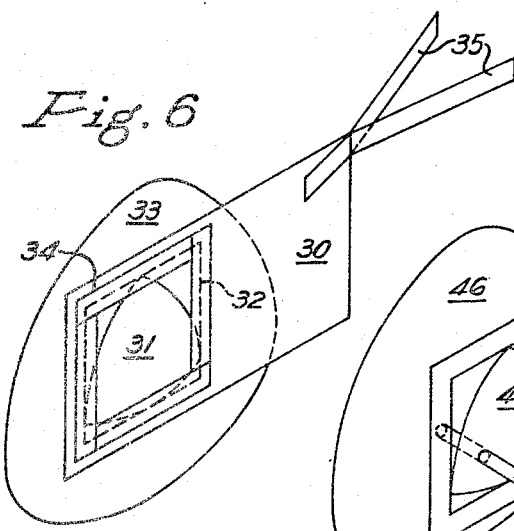
FIG. 6 is a diagrammatic illustration of our invention as applied to one-wheeled vehicle.

Our vehicle may be varied in many ways. As an example, it is quite possible to build a one-wheeled vehicle. Referring to FIG. 6, member 31 may be mounted immediately beside wheel 33. Retaining means 34 are provided to keep member 31 in the template-like recess 32 on chassis 30. Wheelbarrow-like handles 35 may be attached to the chassis.

Figure 7:
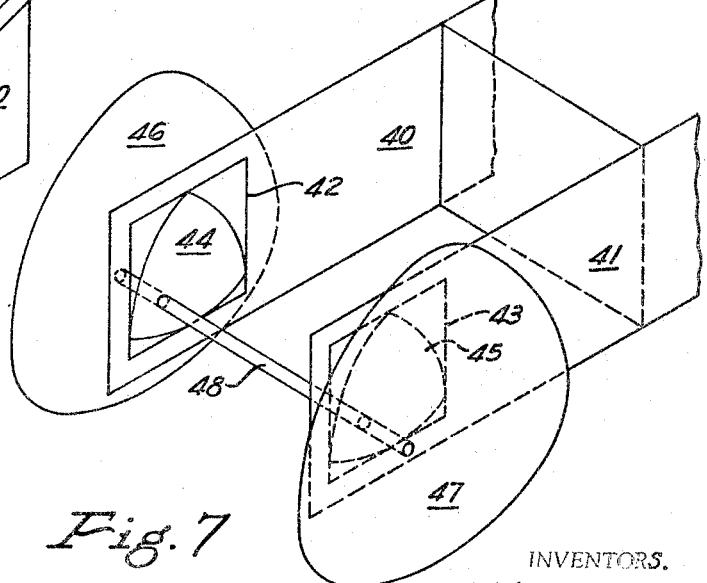
FIG. 7 shows, again more or less diagrammatically, the use of a double-framed chassis support for an axle of our design.

In the variation of FIG. 7, stability is provided by the use of two internal Rouleaux triangle members 44 and 45 set respectively in square recesses 42 and 43 in chassis 40 and 41. As previously explained, wheels 46 and 47 are mounted rigidly with respect to axle 48 and internal Rouleaux triangles 44 and 45.

It should be noted that, in FIGS. 5 and 7, the axle passes through the wheels and the regular Rouleaux triangle (i.e., rigid member 23) at geometrically identical, or corresponding, points. This is necessary for proper operation of the toy. We have observed that the Rouleaux triangles of the wheels and the internal rigid member 23 will follow parallel paths when the axle is rigidly connected as indicated. The chassis will move perfectly parallel to a floor.

Our invention may employ any number of wheels. It should be noted that the bottom surface of working surface 18 may not be necessary, since it provides no support; it does, however, contain the axle. Working surface 18 may therefore be said not to be essentially in the shape of a square, since only the upper surface and two parallel, right angle sides are all that are essential.

The Rouleaux triangle is only one type of closed curve of constant width. The irregular types may be used also, the enlarged or expanded wheel members may be designed in the same manner as the regular type described herein. See the article "Scientific American" supra. Any closed curve of constant width other than a circle is contemplated in our invention so long as it is capable of turning in a square.

We do not intend to be limited to the above described specific embodiments and illustrations. Our invention may be otherwise variously practiced and embodied within the scope of the following claims.

We claim:
1. A vehicle comprising:
   (a) at least one wheel in the shape of an expanded Rouleaux triangle based upon an equilateral triangle having sides of lengths AB,
   (b) an eccentric support member having a contour in the shape of a minimum area Rouleaux triangle based on an equilateral of sides of length AB,
   (c) an axle attached to said eccentric support member at a point C and also attached to said wheel at a point thereon equivalent to point C in its respective equilateral triangle,
   (d) a chassis including a support member for receiving said eccentric support member and having a recess substantially in the shape of a square of sides equal to AB and a smooth interior surface on which the said Rouleaux triangle contour of said eccentric support member may turn.

2. A vehicle comprising:
   (a) at least one pair of wheels in the shape of expanded Rouleaux triangles based upon equilateral triangles having sides of length AB,
   (b) a support member comprising a rigid member in the shape of a Rouleaux triangle based on an equilateral triangle having sides of length AB,
   (c) a chassis having at least one substantially square recess therein of sides length AB, adapted to receive said support member,
   (d) an axle rigidly connecting said wheels and said support member in a common orientation, whereby, when said chassis is moved in a direction parallel to a surface on which said wheels is resting, the support member is caused to turn in said recess as the wheel turns, thereby maintaining the motion of the chassis parallel to said surface.

3. A wheel and axle assembly useful in toy vehicles comprising:
   (a) at least one rigid member in the shape of a Rouleaux triangle based on an equilateral triangle having sides of length AB,
   (b) a pair of wheels in the shape of an expanded Rouleaux triangle based on an equilateral triangle having sides of length AB,
   (c) axle means rigidly connecting said wheels and said rigid member, said rigid member being between said wheels on the axle, at identical points with respect to their equilaterial triangles.

4. The assembly of claim 3 in which there are two rigid members (a).

5. The assembly of claim 3 in which at least one of said rigid members (a) is in contact with a wheel.

6. The assembly of claim 3 in combination with a chassis member having square-shaped recesses for receiving said rigid members.

7. The assembly of claim 3 in combination with a chassis having a recess for receiving each rigid member, said recesses having horizontal upper working surface of length AB and two parallel, right-angle sides each having a length of at least AB.

8. A wheel and axle assembly useful in toy vehicles comprising:
   (a) at least one rigid member in the shape of a closed curve of constant width other than a circle,
   (b) at least one wheel in the shape of an expanded closed curve of constant width based upon the shape of said rigid member, and
   (c) axle means rigidly connecting said wheel and said rigid member at corresponding points.

9. A toy vehicle comprising:
   (a) a chassis having a recess including a horizontal working surface of length AB and two parallel downward-extending right angle side working surfaces of lengths at least AB,
   (b) a rigid member in the shape of a closed curve of constant width, other than a circle, capable of turning in said recess while continuously in contact with all three working surfaces thereof,
   (c) at least one wheel in the shape of a closed curve of constant width expanded from the shape of said rigid member, and
   (d) axle means rigidly connecting said rigid member and said wheels at identical points with respect to the shape of said rigid member.

10. A pull toy comprising:
    the vehicle of claim 9 including a cord for pulling said toy.

References Cited

Publication: Gardner, Mathematical Games, "Scientific American," February 1963, page 148.

LOUIS G. MANCENE, *Primary Examiner.*

C. R. WENTZEL, *Assistant Examiner.*